United States Patent [19]

Miller

[11] 3,909,469

[45] Sept. 30, 1975

[54] POLYETHYLENIMINE ADHESIVE

[76] Inventor: Adolph Miller, 340 E. 64th St., New York, N.Y. 10021

[22] Filed: Sept. 16, 1974

[21] Appl. No.: 506,039

Related U.S. Application Data

[63] Continuation-in-part of Ser. No. 299,634, Oct. 20, 1972, abandoned.

[52] U.S. Cl. .................. 260/15; 161/197; 161/214; 161/228; 260/29.2 N; 260/29.4; 260/29.6 B
[51] Int. Cl.² ........................................... C08L 1/28
[58] Field of Search ......... 260/15, 67.5, 13, 29.2 N, 260/29.4, 29.6 B, 72; 161/197, 214, 227–230

[56] References Cited
UNITED STATES PATENTS

| | | | |
|---|---|---|---|
| 3,418,204 | 12/1968 | Goldstein et al.................. | 162/164 |
| 3,471,359 | 10/1969 | Goldstein........................... | 161/227 |

OTHER PUBLICATIONS

Organic Chemistry, 2nd Ed., Fieser and Fieser, pp. 161–165, Heath and Co., Editor – copyright 1950.

*Primary Examiner*—Melvin Goldstein
*Assistant Examiner*—Edward Woodberry
*Attorney, Agent, or Firm*—Hopgood, Calimafde, Kalil

[57] ABSTRACT

An adhesive composition is provided comprising a water solution of polyethylenimine containing an aldehyde in an amount which normally causes the solution to gel or form gel particles, the solution also containing a water-soluble carboxylic acid in an amount effective to inhibit gel formation of said composition. The composition is particularly useful in forming strong water-resistant bonds along the interface of plastic laminates.

8 Claims, No Drawings

POLYETHYLENIMINE ADHESIVE

The present application is a continuation-in-part of U.S. application Ser. No. 299,634, filed Oct. 20, 1972, now abandoned.

This invention relates to an adhesive composition comprising polyethylenimine and, in particular, to a water solution of said polyethylenimine adhesive containing an aldehyde for use in producing strong water-resistant bonds at the interface of plastic laminates.

STATE OF THE ART

The production of plastic laminates in the form of thin sheeting to be used in the construction of food packages is well known. Generally speaking, the laminates used in the food packaging field comprise transparent structures formed from plastic sheeting to which is bonded at least one other plastic sheet depending upon the properties desired of the resulting packaging material.

Among the more common transparent laminates employed, for example, in the vacuum-packing of smoked meat products or nitrogen-flushed natural cheese, are laminates of polyester film-polyvinylidene chloride (saran)-polyethylene, nylon-saran-polyethylene, and cellophane-saran-polyethylene, among others. Certain vacuum-packed meats, such as frankfurters, do not require saran as part of the laminate. A particularly useful polyester film is one sold under the trademark "Mylar."

Each element making up the laminate serves a particular function. For example, polyester, nylon and cellophane each provide strength and rigidity and some resistance to the diffusion of oxygen into the package. A particular advantage of polyester and nylon is that the web of such materials can be formed to the shape of a mold by heating the web to above its softening point, drawing it (by vacuum or pressure) into the mold and then cooling. This provides the third dimension of the package for accommodating a stack of meat slices. The use of saran as part of the laminate assures low oxygen and water-vapor permeability, while polyethylene provides a surface which is heat sealable. Polyethylene also adds toughness to the package and also exhibits low permeability to water vapor.

The purpose of vacuum-packing meat is to preserve the reddish color which otherwise deteriorates to a brown or grayish shade rather rapidly in the presence of light and oxygen. The absence of oxygen in the cheese package by nitrogen-flushing avoids mold growth.

Broadly speaking, two methods are employed in the manufacture of combined plastic structures, to wit: (1) laminating and (2) extrusion coating. Laminating involves combining two preformed films which are purchased from a supplier by a converter who then puts them together. If the finished product requires a layer of saran, a saran-coated plastic film is obtained by the converter from the supplier. The substrate of such saran-coated films may comprise polyester, nylon, cellophane, polypropylene, and the like.

As illustrative of the thicknesses of a typical polyester-saran-polyethylene composite, the following is given:

| Polyester | 0.0005" | } obtained as a |
| Saran | 0.00005" | } saran-coated film |
| Adhesive | 0.00005" | } applied by the converter |
| Polyethylene | 0.002" | } obtained as a separate film |

In producing the composite structure, the polyester film is taken through an application station where the wet adhesive is applied. The adhesive-coated film is then passed through a drying tunnel where the adhesive solvents are evaporated, thereby leaving the adhesive solids on the film. The adhesive-coated film is subsequently fed into the nip of a pair of rolls. One of the rolls may be made of metal and the other rubber-covered, the metal roll being heated internally. The polyethylene film is also fed into the nip of the rolls in faying relationship to the adhesive-coated polyester film and the lamination accomplished at the nip by the application of pressure and heat and the resulting laminated web then wound up.

This process is generally used for laminating any two films together (or a film and metal foil). The most common adhesives presently employed comprise urethane formulations using such solvents as ethyl acetate, methyl ethyl ketone, toluol and sometimes dioxane.

In the case of extrusion coating using a polyethylene resin, a film, such as polyester, nylon, cellophane and the like, is used as the substrate upon which the resin is extruded. The substrate is first coated with an adhesion promoter, since molten polyethylene does not adhere well to the substrate. The adhesion promoter is referred to in the trade as a "primer". The resin is processed through a screw extruder, the barrel of which is heated, and the resin forced through a slot die as a molten sheet drawn down to the required thickness. The resin sheet is forced against the plastic substrate at the nip of a pair of rolls.

Polyethylene film which is to be converted further, that is, printed or laminated, is exposed to a corona discharge in order to assure adequate bonding of the adhesive or ink to polyethylene. For some reason which is not clearly understood, the polyethylene surface is activated to provide good bonding with the ink or adhesive subsequently applied to the surface. The corona discharge treatment of polyester and nylon films also renders them more receptive to bonding.

In laminating plastic films together, the adhesive layer is usually referred to as an "adhesive", while in extrusion coating, the adhesion promoter is referred to as the "primer". The reason for this is the difference in quantity applied. In laminating, the dry solids of "adhesive" applied is of the order of one pound per ream (a ream equals 432,000 sq. in. or 3000 sq. ft. or 333 sq. yards). In extrusion coating, the amount used is of the order of a few tenths of a pound per ream.

Polyethylenimine has been used for some time as an extrusion coating primer in the industry. It has particularly found use for bonding polyethylene to paper and other cellulosic substrates. In practice, it is applied from dilute water or water-alcohol solutions.

While the bonds produced with this adhesive or primer are quite strong, they exhibit poor resistance to water. That is to say, exposure to liquid water, as in accidental immersion, or to high humidities, causes the bond to weaken and delamination of the plies to occur. This usually resulted in package failure.

An attempt was made to modify the polyethylenimine adhesive and render it more resistant to moisture by reacting it with an aldehyde, since polyethylenimine (PEI) contains both imino ($R_1$-NH-$R_2$) and amino ($R_1$-$NH_2$) groups and since the reaction of an aldehyde therewith (e.g. formaldehyde) provides the equivalent of an aldehyde-ammonia reaction. However, tests indicated that for each concentration level of PEI, there was a limit as to the amount of aldehyde that could be added before gelation of the solution occurred. The gel product (e.g. gel particles) is insoluble in water. The solution either completely gels depending on the concentration of aldehyde added or gel particles form, even when the PEI solution is very dilute. The amount of aldehyde that can be incorporated in a PEI solution of a particular concentration without the formation of gel does not give the maximum desired level of water resistance, for example, when the combination of PEI and formaldehyde (HCHO) is used as a primer or adhesive.

In U.S. Pat. No. 3,418,204, an anchoring agent is disclosed for bonding pigments and polyolefins to cellulosic materials, the anchoring agent being formed by cross-linking polyalkylene imines with sufficient formaldehyde to react with one-half to three-quarters of the —NH— groups in the polyalkylene imine. This improves pigment retention in cellulosic fibrous materials by reacting with the anchoring agent. While the patent states that the polyethylene solution with the formaldehyde can be acidified with a mineral acid, it is apparent it is not an essential requirement. The patent is not concerned with gelation as a problem; nor is the subject matter mentioned.

When a PEI solution containing an aldehyde gels, it is very difficult to apply as a thin adhesive or primer coating onto a substrate. It would be desirable to provide a PEI-aldehyde solution which does not gel prior to its application to a substrate and which, when applied to a substrate for producing a laminated structure, provides a strong bond substantially resistant to water, moisture or relatively high humidities.

OBJECTS OF THE INVENTION

It is thus the object of the invention to provide a substantially non-gelling solution of a polyethyleneimine adhesive containing an aldehyde.

Another object is to provide a substantially non-gelling water solution of polyethylenimine and an aldehyde which, when employed as an adhesive in laminating plastic films together, or a plastic film to a substrate, produces a strong bond which is substantially water-resistant.

A still further object of the invention is to provide a method of inhibiting the gellation of a polyethylenimine solution containing an aldehyde, such as formaldehyde.

These and other objects will more clearly appear when taken in conjunction with the following disclosure and the appended claims.

STATEMENT OF THE INVENTION

Stating it broadly, the invention provides an adhesive composition comprising a substantially non-gelling water solution of polyethylenimine and an amount of water-soluble aldehyde which normally causes the solution to gel or form gel particles, the solution also containing a water-soluble carboxylic, e.g. acetic acid, in an amount effective to inhibit gel formation of the adhesive composition, provided the PEI solution is acidified first with the carboxylic acid before the addition of said aldehyde.

The carboxylic acids preferably include aliphatic carboxylic acids containing up to 6 carbon atoms. Other carboxylic acids can be employed so long as they are sufficiently water-soluble. A preferred carboxylic acid is acetic acid, although propionic, butyric, malonic and succinic acids, or their anhydrides, may be employed, among others. As regards those carboxylic acids which have limited solubility in water, it is possible to increase their solubility by dissolving them in organic solvents which are miscible with water, such as alcohol.

The water-soluble aldehydes include those selected from the group consisting of formaldehyde, acetaldehyde, propionaldehyde, butyraldehyde and chloral.

It has been found that the addition of the foregoing carboxylic acids to the PEI solution prior to the addition of aldehyde inhibits the formation of gel particles in very dilute PEI solutions or the formation of a gelatinous mass at higher PEI concentrations of the order of 10% by weight PEI and higher. On drying, the resulting adhesive composition was found to exhibit improved water-resistance, while retaining optimum adhesive effectiveness.

In addition to PEI, the carboxylic acid and the aldehyde, the solution may contain a small but effective amount of a thickener to give body to the solution, a curing resin to further improve its water-resistance after heat sealing and a defoamer to inhibit the formation of suds which interferes with the application of the solution.

The adhesive solution may be employed essentially over a broad range of composition comprising by weight about 1% to 15% polyethylenimine, about 0.2% to 5% aldehyde (e.g. formaldehyde), about 0.015% to 6% of the acid based on the carboxyl radical or group of the carboxylic acid. In other words, the amount of carboxylic acid added is calculated on the amount of carboxyl radical, that is, the COOH group. Thus, 0.015% by weight of COOH corresponds to 0.02% by weight of $CH_3COOH$ or 0.025% by weight of $C_2H_5COOH$.

A more preferred composition is one containing about 1% to 8% polyethylenimine, about 0.25% to 2.5% aldehyde (e.g. formaldehyde), about 0.04% to 3% of the carboxyl radical or group, and the balance essentially water.

If it is desired to use a thickener, a curing resin and a defoamer with either of the foregoing compositions, these may be employed singly or together over the following ranges by weight: about 0.01% to 1% of a thickener, such as thickeners selected from the group consisting of hydroxyethylcellulose, polyvinyl alcohol and methylcellulose, about 0.03% to 2.0% melamine-formaldehyde or urea-formaldehyde as the curing resin and about 0.0005% to 0.1% of a defoamer, such as dimethylpolysiloxane.

DETAILS OF THE INVENTION

As illustrative of the detail aspects of the invention, the following examples are given:

EXAMPLE 1

A water solution containing 2% by weight of PEI was prepared. To 100 grams of the solution was added a 40% solution of formaldehyde (HCHO) from a burette with constant agitation. It was noted that particles of gel tended to form after the addition of 1 ml of the HCHO solution. Further additions of the HCHO solution increased the amount of gel particles formed.

To a second 100 gram batch of the same 2% PEI solution was first added 0.1 gram of glacial acetic acid ($CH_3COOH$) before the addition of the HCHO solution. No gel particles formed, even when 200 ml of HCHO were added.

EXAMPLE 1A

The order in which the acetic acid is added is important in order to achieve the desired results. A first solution was produced comprising 25 grams of 37% formaldehyde (HCHO) in water and 1 gram of acetic acid ($CH_3COOH$). A second solution was then prepared comprising 10 grams of 25% PEI in 87.4 grams of water giving a total quantity of PEI/water solution of 97.4 grams. To the PEI/water solution were added 2.6 grams of the $HCHO/CH_3COOH$ mixture giving a total of 100 grams with the following composition:

| | |
|---|---|
| PEI | 2.500 |
| $CH_3COOH$ | 0.100 |
| $H_2O$ | 96.475 |
| HCHO | 0.925 |
| | 100.000 |

In adding the $HCHO/CH_3$ mixture to the PEI/water solution, gel particles formed and the solution became quite hazy. Thus, while the final solution contained the same amount of acetic acid (0.1%) as the solution in Example 1, the foregoing method of adding the acid did not prevent gelation. In other words, the PEI solution must be acidified first with the carboxylic acid before adding the formaldehyde.

EXAMPLE 2

An adhesive composition was prepared by mixing 100 grams of a 2% PEI solution with 0.1 gram glacial acetic acid and 2 ml of 40% HCHO solution (water solution). The adhesive composition was coated on the surface of a coronadischarge treated polyester film (0.0005 inches thick) which was then laminated to a corona-discharge treated film of low density polyethylene at a temperature of 200°F. The bond achieved was film-tearing; that is to say, the polyester film failed before the plies separated.

In the case where the 2% PEI solution alone was used as the adhesive on the same materials under the same conditions, the lamination separated easily under a pull test.

EXAMPLE 3

To a 100 gram batch of a 3% water solution of PEI was added an amount of a 40% solution of HCHO as in Example 1. One milliliter of HCHO caused gel particles to form. However, when 0.2 gram of $CH_3COOH$ was first added to the PEI solution prior to the addition of formaldehyde, the formation of gel particles was inhibited following addition of formaldehyde.

EXAMPLE 4

To a 100 gram batch of a 4% PEI solution was added 2.5 ml of the 40% HCHO solution. The entire mass gelled. However, when 2.5 grams of $CH_3COOH$ were added prior to HCHO, no gel or gel particles formed, even after the addition of 300 ml of HCHO solution.

EXAMPLE 5

In this test, 2.5 ml of a 40% HCHO solution were added to a 6% water solution of PEI. The entire mass gelled. With a prior addition of 0.5 gram glacial $CH_3COOH$, it took 3.9 ml of the 40% HCHO solution to gel the entire mass. However, when 1.5 grams of glacial acetic acid were added to the 6% PEI solution, up to 90 ml of the HCHO solution could be added with no gel formation.

EXAMPLE 6

Using an 8% aqueous solution of PEI, it was found necessary to add 3 grams of glacial $CH_3COOH$ to prevent gel formation following the subsequent addition of the HCHO solution.

As will be noted from Examples 5 and 6, the greater the concentration of the PEI solution, the larger is the amount of acid required to inhibit gel formation when the HCHO is subsequently added to the solution.

EXAMPLE 7

Tests showed that with a 10% aqueous solution of PEI, it is necessary to add 5 grams of glacial acetic acid to prevent gel formation following the addition of HCHO.

The use of carboxylic acids also inhibits gel formation caused by the water-soluble aldehydes, such as acetaldehyde, propionaldehyde, butyraldehyde, and chloral. Thus, the combination of PEI, acid and aldehyde can be made without the formation of gel particles or mass gelation over a fairly broad range of PEI concentration, so long as sufficient carboxylic acid is present to inhibit the formation of gel particles.

It is preferred to use carboxylic acid, especially acetic acid, as the inhibitor since it is volatilizable and also since it does not present food adulteration problems as may occur with certain of the mineral acids, e.g. $H_3PO_4$, $H_2SO_4$, and the like, which should be avoided as they tend to be retained in the composite after drying which is undesirable.

It is to be understood that some carboxylic acids are more soluble than others. However, so long as the amount employed falls within the stated range based on the amount of COOH radical present, and so long as it inhibits gelling, it is within the purview of the invention.

As a preferred embodiment, it may be desirable to enhance further water-resistance of the bond and even provide superior bonding as between such surfaces as paper and cellophane. Thus, modifying resins may be added to the PEI-acid-aldehyde composition. Such resins may be selected from the group of water-soluble and/or dispersible resins, such as melamine-HCHO and urea-HCHO. Particularly useful materials in the foregoing group are the PAREX resins produced by the American Cyanamid Company.

In order to control viscosity and improve the runability of the adhesive composition on a laminating machine, it may be desirable to add non-ionic water-soluble thickening agents to the composition, such as hydroxy-ethylcellulose, polyvinyl alcohol and methylcellulose.

In addition, since such compositions tend to generate foam, it may often be necessary to add a defoamer, such as dimethylpolysiloxane to render the composition more readily usable as an adhesive or adhesive promoter.

Thus, as stated hereinbefore, the adhesive composition of the invention may also contain as a preferred embodiment by weight about 0.01% to 1% of a thickener from the group consisting of hydroxycellulose, polyvinyl alcohol and methylcellulose, about 0.03% to 2% melamine-formaldehyde or urea-formaldehyde, as a curing resin and about 0.0005% to 0.1% dimethylpolysiloxane as a defoamer.

The types of adhesive compositions described herein when coated on a corona-discharge treated polyester or nylon film and dried using hot air and then combined with a corona-discharged treated polyethylene film at temperatures in the range of 165°F to 210°F at pressures of 20 to 60 psi, produced good bonds. Following heat-sealing of the composite structure, markedly improved tearing bond strengths were obtained.

Examples of other adhesive compositions which are provided by the invention are as follows:

| PEI Solution | Acid | Aldehyde |
| --- | --- | --- |
| 100 grs - 2% | 0.5 gr $CH_2(COOH)_2$ | 1 gr acetaldehyde |
| 100 grs - 4% | 0.75 gr $C_2H_5COOH$ | 2 grs propionaldehyde |
| 100 grs - 6% | 1.5 grs $CH_3COOH$ | 2.5 grs chloral |

A preferred composition which has been found particularly useful as is follows:

| | |
| --- | --- |
| PEI (40,000 – 60,000 Mol. Wt) | 2.500% |
| Hydroxyethylcellulose | 0.050% |
| Acetic acid | 0.090% |
| Melamine - Formaldehyde | 0.248% |
| Dimethylpolysiloxane | 0.002% |
| Formaldehyde | 0.925% |
| Water | 96.185% |
| | 100.000% |

As will be noted, the aforementioned preferred composition contains 2.5% by weight of PEI. Generally speaking, the adhesive in actual practice is used at the lower end of the broad composition range of 1% to 15%. Thus, while solutions of 2.5% and above may be used as adhesive solutions, they are preferably used as master solutions which are diluted by the user to the desired concentration level. In this case of the solution composition containing 2.5% PEI, it would not be uncommon for the user to dilute it on a 50:50 basis with water to a level of approximately 1.25%. Thus, the broad range of about 1% to 15% and the preferred range of 1% to 8% may encompass both the composition as used or master compositions which can be diluted to any desired level within the broad and preferred ranges. The important thing is that the solutions contain carboxylic acid as an inhibitor to prevent the formation of gel particles or complete gelling. Thus, the solutions can be stored for long periods of time without deteriorating.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An adhesive composition suitable for strongly bonding a plastic film onto a substrate which comprises, a substantially non-gelling water solution of polyethylenimine and a water-soluble lower aldehyde in an amount ranging by weight from about 1% to 15% polyethylenimine and about 0.2% to 5% aldehyde, said solution also containing about 0.015% to 6% by weight of a water-soluble aliphatic carboxylic acid containing up to 6 carbon atoms, said amount being based on the carboxyl radical of said acid, the amount of said acid being effective when added during the formulation of said composition before the addition of said lower aldehyde to inhibit gel formation of said adhesive composition due to the subsequent addition of said aldehyde, the amount of acid employed increasing with increased amounts of polyethylenimine over said ranges, said composition also containing by weight 0.01% to 1% of thickener selected from the group consisting of hydroxyethylcellulose, polyvinyl alcohol and methyl cellulose, about 0.03% to 2% of curing agent selected from the group consisting of melamine-formaldehyde and urea-formaldehyde and about 0.005% to 0.1% of a defoaming agent.

2. The adhesive composition of claim 1, wherein the polyethylenimine ranges from about 1% to 8%, the aldehyde from about 0.25% to 2.5% and the carboxylic acid from about 0.04% to 3% based on the carboxyl radical.

3. The adhesive composition of claim 1, wherein the aldehyde is selected from the group consisting of formaldehyde acetaldehyde, propionaldehyde, butyraldehyde and chloral.

4. The adhesive composition of claim 1, wherein the aldehyde is formaldehyde and wherein the acid is acetic acid.

5. The adhesive composition of claim 4, wherein the polyethylenimine ranges from about 1% to 8%, the formaldehyde from about 0.25% to 3% and the acetic acid from about 0.04% to 3% by weight of the carboxyl radical.

6. A method of inhibiting the gelation of a water solution of polyethylenimine and an aldehyde which comprises, first forming a solution of about 1% to 15% by weight of polyethylenimine in water, acidifying said solution with a water-soluble aliphatic carboxylic acid containing up to 6 carbon atoms in an amount ranging by weight from about 0.015% to 6% of the carboxyl radical effective to inhibit gelation of said solution when a gelation-forming amount of about 0.2% to 5% by weight of a lower aldehyde is subsequently added to said polyethylenimine solution, and following the addition of said carboxylic acid then adding said aldehyde to said acidified solution in an amount which would normally cause gelation to occur, the amount of acid employed increasing with increased amounts of polyethylenimine over said ranges.

7. The method of claim 6, wherein said aldehyde is selected from the group consisting of formaldehyde, acetaldehyde, propionaldehyde, butyraldehyde and chloral and said acid is acetic acid.

8. The method of claim 7, wherein the composition also includes by weight about 0.01% to 1.0% of a thickener from the group hydroxyethylcellulose, polyvinyl alcohol and methycellulose, about 0.03% to 2.0% curing resin from the group melamine-formaldehyde and urea-formaldehyde and about 0.0005% to 0.1% dimethylpolysiloxane as a defoamer.

* * * * *

UNITED STATES PATENT OFFICE
CERTIFICATE OF CORRECTION

Patent No. 3,909,469          Dated September 30, 1975

Inventor(s) Adolph Miller

It is certified that error appears in the above-identified patent and that said Letters Patent are hereby corrected as shown below:

column 8, claim 1, line 26, "0.005%" should be --0.0005%--.

Signed and Sealed this twenty-fourth Day of February 1976

[SEAL]

Attest:

RUTH C. MASON
*Attesting Officer*

C. MARSHALL DANN
*Commissioner of Patents and Trademarks*